Oct. 6, 1931. F. H. LAURILA 1,826,251
TIP-UP
Filed Aug. 28, 1930
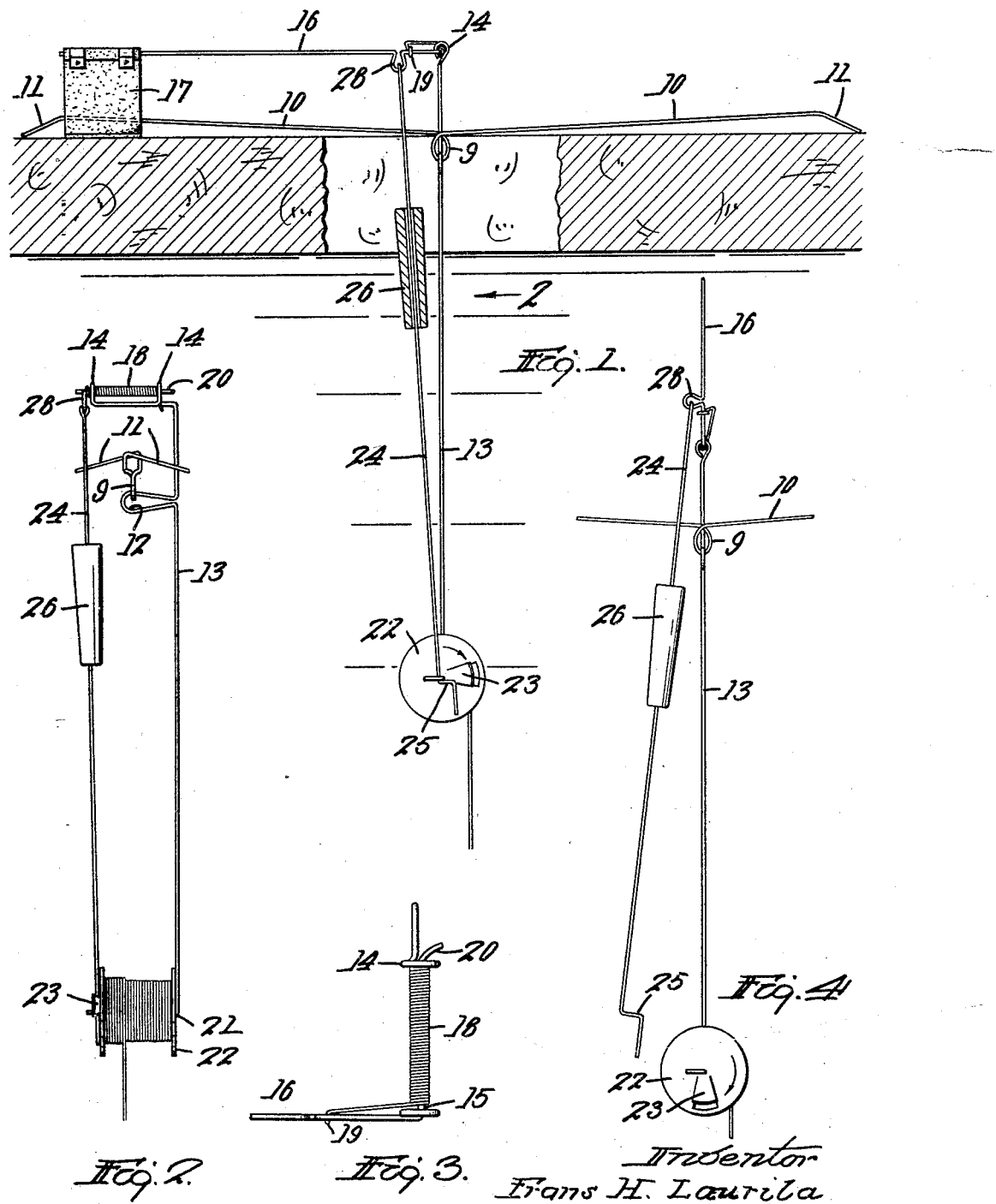
Inventor
Frans H. Laurila
By Attorneys Patented Oct. 6, 1931

1,826,251

UNITED STATES PATENT OFFICE

FRANS HJALMAR LAURILA, OF WORCESTER, MASSACHUSETTS

TIP-UP

Application filed August 28, 1930. Serial No. 478,465.

This invention relates to a tip-up for use in fishing through the ice.

The principal objects of the invention are to provide a construction in which the flag or signal is operated even when the surface of the water is frozen over; to provide simple and inexpensive means for supporting the tip-up from the ice; to provide means for holding the reel submerged in the water; to provide effective means extending above the ice for releasing the flag or other signal automatically by the action of the reel in unwinding; and to provide it in such form that it can be folded up into small compass for transportation and storage.

Other objects and advantages of the invention will appear hereinafter.

Reference is to be had to the accompanying drawings, in which

Fig. 1 is a side view of a tip-up constructed in accordance with this invention and shown in operative position ready to be released upon the pulling of the line;

Fig. 2 is a side view of a part of the same looking in the direction of the arrow 2 in Fig. 1;

Fig. 3 is a plan of a portion of the device in the position shown in Fig. 1; and Fig. 4 is a view similar to Fig. 1 but showing the reel rotated and the signal released.

This invention relates to that class of tip-ups designed for the purpose of displaying a flag or signal at any time when the fish gets on the hook. Most of these devices have been open to the difficulty that on a very cold day, or if left over night, the freezing of the surface of the water will prevent the release of the tip-up. By means of this invention, that difficulty is avoided and the various parts can be folded up into small compass for transportation and storage.

The invention is shown in a form comprising a wire 10 constituting a support and having points 11 on its ends extending at different angles so that one of them will always be in a position to stick into the ice. At its center it is provided with a loop furnishing an opening 9. Into this opening extends a loop 12 pivotally carrying a wire support 13 for the reel. This opening 9 is so located that this support can be turned up into horizontal position and will be capable of being retained in this opening in the plane of the wire 10.

As indicated in Fig. 1 this wire 10 is intended to be supported on the surface of the ice with the reel support 13 depending vertically from its pivot loop 9 down through the hole in the ice and into the water beneath. At the top of the wire support 13 are a pair of loops 14 in which is pivotally mounted a horizontal end 15 of a rod 16 which is provided with a flag 17 or other signal at the other end. There is also a coil spring 18 coiled on the end 15 with one end in the form of a hook 19 adapted to engage the rod 16 at all times and the other in the form of an arm 20 furnishing a stop against the supporting frame 13. Of course this spring provides a constant yielding tendency to pull the rod 16 up as shown in Fig. 4 where it is stopped by the arm 20 and where the signal is displayed.

The support 13 is provided at the bottom with a horizontal band 21 on which the reel 22 is pivotally mounted. The reel is formed with two circular flanges, one having a projecting trigger or arm 23.

The rod 16 is provided with a loop 28 for pivotal attachment of a depending rod 24. On its lower end the rod is provided with a bent end 25 for cooperation with the reel trigger 23. When set as shown in Figs. 1, 2 and 3, this end 25 engages the arm 21 to hold the rod 16 and the flag down in the position shown in Fig. 1 under normal conditions. When so held a normal amount of swinging of the support 13 on its pivot will not release the flag.

When turned in a downward direction as in Fig. 4 by the pull of a fish, the turning of the reel will force this end outwardly and allow the spring 18 to force the flag up. On the rod 24 is provided a wooden slide 26. The passage through this slide in which the rod 24 is located is filled with grease or the like to prevent the entrance of water into the passage and therefore to prevent freezing. The slide is located at the water level.

The tip-up is set up as shown in Figs. 1, 2 and 3. Now when a fish bites and draws down the line on the reel, the reel will turn and within one revolution the arm 23 will release the rod 24 as shown in Fig. 4. This allows the spring 18 to raise the flag.

When the device is to be carried away the parts can all be folded up in one plane practically without taking the reel off. In this way the device can be transported or stored and will take up only a small space in an automobile or other vehicle. It is non-freezing and is always in condition for operation and is very convenient and simple in every way.

Although I have illustrated and described only one form of the invention, I am aware of the fact that modifications can be made therein by any person skilled in the art without departing from the scope of the invention as expressed in the claims. Therefore I do not wish to be limited in this respect but what I do claim is:—

1. In a tip-up, the combination with a wire adapted to rest on the ice and having ends extending angularly in different directions to engage the ice, and a spring-pressed signal device mounted thereon, of a support pivoted to the wire, a reel carried by the support and having an arm, a rod depending from the signal device, a slide on the rod having a passage for the rod filled with grease, and a trigger on the reel for releasing rod to display the signal device.

2. In a fishing device, the combination with a wire adapted to rest on the ice and a support pivotally connected therewith, of a spring-pressed signal device pivotally mounted on the support, a reel carried by said support under water, a trigger on the reel, a rod pivotally depending from the signal device and having a projection at the lower end for engaging the trigger and holding the reel, whereby when the reel is turned the signal device will be released and moved into displaying position by the spring.

3. In a device for use in fishing, the combination with a member adapted to be supported on the ice over a hole therein, of a support pivotally mounted on said member in vertical position with the lower end extending down through the hole and into the water, a reel rotatably carried by the bottom of said support and having a projecting arm, a spring-pressed signal pivotally carried by the support, a rod pivotally depending from the signal and having an end engaging said arm to hold the signal down until the reel is turned, when the rod is fixed and the signal displayed.

4. In a device for use in fishing, the combination with a member adapted to be supported on the ice over a hole therein, a support pivotally mounted on said member and projecting above and below it and having a horizontal arm at the top, a signal device pivotally mounted on said arm, a spring having a hook engaging said signal device to normally force it up to substantially vertical position, said signal device having a stop for engaging said arm for preventing its going beyond vertical position, a rod pivotally depending from the signal device to hold it down, an arm carried by said rod for disengaging the signal device and a reel carried by the support and having means for holding the rod down, adapted to be released by the turning of the reel.

5. In a fishing device, the combination with a member adapted to be supported on the ice, a support pivotally connected with the member, a signal device carried thereby, said support extending down into the water and having means on the bottom for holding a shaft, a shaft carried by said means, a reel for a fishing line freely rotatable on the shaft, and means on the reel for causing the signal device to be released when the reel is turned.

6. In a device for use in fishing, the combination of a support extending down into the water, a reel thereon, a signal device, said reel having means for holding the signal device down and for releasing the signal device comprising a vertical rod, a wooden slide on the rod and a filling of grease in the hole through the slide to keep it from freezing.

In testimony whereof I have hereunto affixed my signature.

FRANS HJALMAR LAURILA.